US012567333B2

(12) United States Patent
Neuhaeuser

(10) Patent No.: US 12,567,333 B2
(45) Date of Patent: Mar. 3, 2026

(54) METHOD, CENTRAL UNIT AND SYSTEM FOR PROVIDING A COMMUNICATION FUNCTION IN A MEANS OF TRANSPORT

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 626 days.

(21) Appl. No.: 17/800,895

(22) PCT Filed: Feb. 11, 2021

(86) PCT No.: PCT/DE2021/100135
§ 371 (c)(1),
(2) Date: Aug. 18, 2022

(87) PCT Pub. No.: WO2021/164820
PCT Pub. Date: Aug. 26, 2021

(65) Prior Publication Data
US 2023/0083268 A1 Mar. 16, 2023

(30) Foreign Application Priority Data
Feb. 23, 2020 (DE) ..................... 10 2020 104 709.6

(51) Int. Cl.
| | |
|---|---|
| *G08G 1/00* | (2006.01) |
| *H04W 64/00* | (2009.01) |
| *H04W 84/18* | (2009.01) |

(52) U.S. Cl.
CPC ............ *G08G 1/20* (2013.01); *H04W 64/006* (2013.01); *H04W 84/18* (2013.01)

(58) Field of Classification Search
CPC ...... G08G 1/20; H04W 64/006; H04W 84/18; H04W 12/08; H04W 4/80; H04L 63/0892; H04L 63/102; H04L 67/12; H04L 67/30
See application file for complete search history.

(56) References Cited

U.S. PATENT DOCUMENTS

| | | | | |
|---|---|---|---|---|
| 9,171,268 B1 * | 10/2015 | Penilla | ...................... | B60L 1/06 |
| 9,365,188 B1 * | 6/2016 | Penilla | ............... | G07C 9/00309 |

(Continued)

FOREIGN PATENT DOCUMENTS

| | | | | | |
|---|---|---|---|---|---|
| CA | 3052234 A1 * | 8/2018 | ............... | G06N 7/08 |
| CN | 110505618 A * | 11/2019 | ............. | H04L 67/12 |

(Continued)

OTHER PUBLICATIONS

Chinese Office Action corresponding to Chinese Patent Application No. 202180008935.2, dated Dec. 5, 2024. (8 Pages).

(Continued)

*Primary Examiner* — Yuwen Pan
*Assistant Examiner* — Swati Jain
(74) *Attorney, Agent, or Firm* — Maginot, Moore & Beck LLP

(57) ABSTRACT

A method for providing a communication function in a means of transport includes receiving, in a central unit of a communication service provider in which identification information of a user is stored, a request from the user to use a communication profile in the means of transport. The method also includes receiving, in a central unit of a manager of the means of transport, a request from the central unit of the communication service provider to provide the communication profile in the means of transport. The method further includes enabling provision of the commu- (Continued)

100

Receive, in a central unit of a communication service provider in which identification information of a user is stored, a request from the user to use a communication profile in a means of transport — 110

Receive, in a central unit of a manager of a means of transport, a request from the central unit of the communication service provider to provide the communication profile in the means of transport — 120

Enable the provision of the communication profile for the means of transport by the central unit of the manager of the means of transport — 130 nication profile for the means of transport by the central unit of the manager of the means of transport.

14 Claims, 2 Drawing Sheets

(56) References Cited

U.S. PATENT DOCUMENTS

| | | | |
|---|---|---|---|
| 2011/0276396 A1* | 11/2011 | Rathod | G06Q 30/0282 |
| | | | 707/706 |
| 2012/0197501 A1* | 8/2012 | Sujan | B60W 30/1882 |
| | | | 701/1 |
| 2014/0045459 A1* | 2/2014 | Hjelm | H04L 63/0861 |
| | | | 455/411 |
| 2015/0097669 A1* | 4/2015 | Li | G08B 21/24 |
| | | | 455/435.1 |
| 2017/0011472 A1* | 1/2017 | Kennon | G06F 21/6218 |
| 2018/0059913 A1* | 3/2018 | Penilla | H04W 12/068 |
| 2018/0234385 A1* | 8/2018 | O'Neil | H04L 63/20 |
| 2019/0263424 A1* | 8/2019 | Penilla | H04L 63/107 |
| 2021/0092568 A1* | 3/2021 | Namiranian | H04W 8/24 |
| 2023/0077434 A1* | 3/2023 | Penilla | G08G 1/205 |
| | | | 709/217 |
| 2023/0164540 A1* | 5/2023 | Baek | H04W 8/265 |
| | | | 455/558 |

FOREIGN PATENT DOCUMENTS

| | | | | |
|---|---|---|---|---|
| DE | 102018207161 A1 | 11/2019 | | |
| DE | 102018126845 A1 | 4/2020 | | |
| WO | WO-2019214842 A1 * | 11/2019 | | H04W 8/205 |
| WO | 2019214842 A8 | 1/2020 | | |

OTHER PUBLICATIONS

English Translation of Chinese Office Action corresponding to Chinese Patent Application No. 202180008935.2, dated Dec. 5, 2024. (10 Pages).
International Search Report corresponding to International Patent Application No. PCT/DE2021/100135, dated May 6, 2021 (4 pages).
German Office Action corresponding to German Patent Application No. 10 2020 104 709.6, dated Nov. 14, 2020 (13 pages).

* cited by examiner

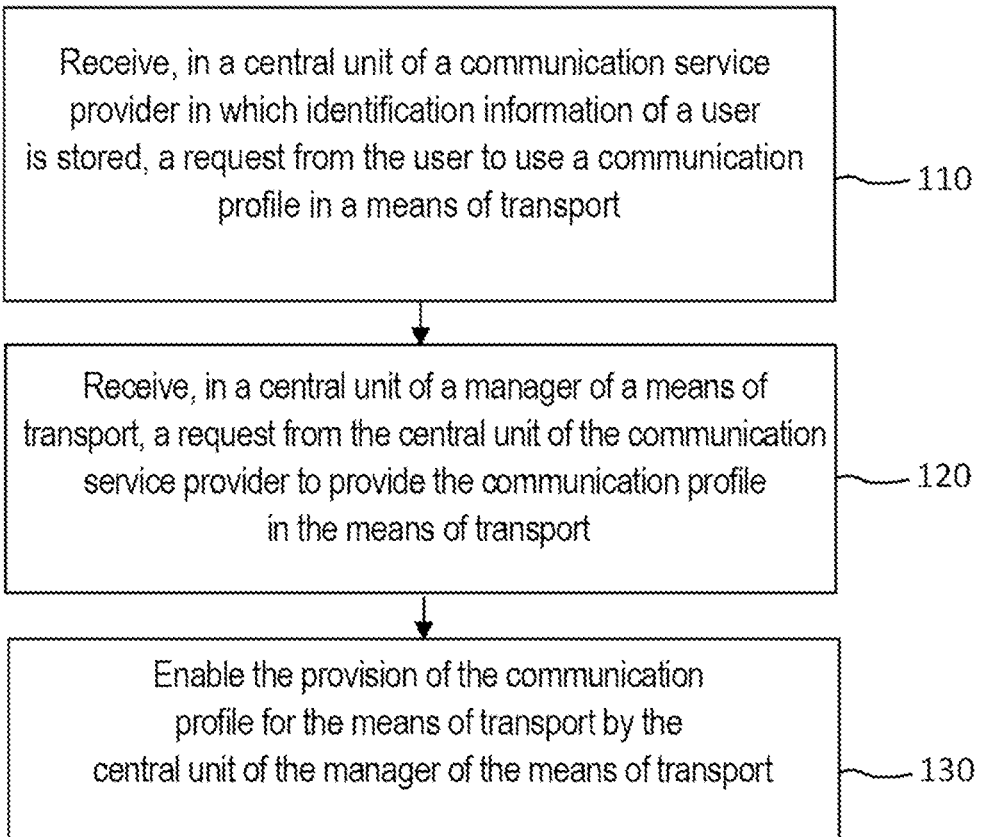

100

Receive, in a central unit of a communication service provider in which identification information of a user is stored, a request from the user to use a communication profile in a means of transport — 110

Receive, in a central unit of a manager of a means of transport, a request from the central unit of the communication service provider to provide the communication profile in the means of transport — 120

Enable the provision of the communication profile for the means of transport by the central unit of the manager of the means of transport — 130

Fig. 1

METHOD, CENTRAL UNIT AND SYSTEM FOR PROVIDING A COMMUNICATION FUNCTION IN A MEANS OF TRANSPORT

The present application is the U.S. national phase of PCT Application PCT/DE2021/100135 filed on Feb. 11, 2021, which claims priority of German patent application No. 102020104709.6 filed on Feb. 23, 2020, which is incorporated herein by reference in its entirety.

TECHNICAL FIELD

The present disclosure relates to a method for providing a communication function in a means of transport, a central unit for providing a communication function in a means of transport, and a system for providing a communication function in a means of transport. The present disclosure relates, in particular, to a flexible provision of a communication capability in means of transport, such as vehicles, for a user.

BACKGROUND

The networking of modern vehicles, for example with the Internet, is becoming increasingly important. Cloud-based services, for example, can be made available to the user in the vehicle. In order to be able to use these and other services, the vehicle comprises a communication module which uses, for example, a SIM card and a digital certificate which is present on the SIM card for communication.

A trend toward a communal use of vehicles, for example car sharing, has recently been observed. It is inconvenient or impossible for users of vehicles of the car sharing fleet to use their own communication profile in the vehicle.

SUMMARY

One object of the present disclosure is to indicate a method for providing a communication function in a means of transport, a central unit for providing a communication function in a means of transport, and a system for providing a communication function in a means of transport which can implement an individual communication function, e.g. in a temporarily used vehicle. One object of the present disclosure is further to improve user-friendliness in managing the communication profiles.

This object is achieved by one or more embodiments of the subject-matter disclosed herein.

According to one independent aspect of the present disclosure, a method for providing a communication function in a means of transport, in particular a motor vehicle, is indicated. The method comprises: receiving, in a central unit of a communication service provider in which identification information of a user is stored, a request from the user to use a communication profile in a means of transport; receiving, in a central unit of a manager of a means of transport (e.g. a backend of a vehicle manufacturer), a request from the central unit of the communication service provider to provide the communication profile in the means of transport; and enabling the provision of the communication profile for the means of transport by the central unit of the manager of the means of transport.

The communication profiles are deployed or used in the means of transport. In other words, the communication profiles are not only provided, but also activated, for example via remote login, i.e. the user receives his communication profile loaded and activated, for example on the basis of an authentication in the MNO. The command for use can be transmitted via a backend, such as, for example, the central unit of the communication service provider.

According to at least some embodiments, a user can load and activate, i.e. use his own communication profile in a means of transport even if the user, for example, has no account with the manager of the means of transport. A communication profile can therefore be provided in the means of transport in a simple manner advantageous to the user. Furthermore, users who do not know any login details for the communication function in the vehicle can nevertheless use the communication function.

The communication service provider can be a manufacturer of the communication profile, and can, in particular, be a network operator of a mobile network (Mobile Network Operator (MNO)). The communication service provider can, for example, enable a communication in a mobile network according to the LTE (Long-Term Evolution) standard and/or the 5G standard.

The method preferably further comprises authorizing the provision of the communication profile by the user in the central unit of the communication service provider. The user can, for example, request and authorize the provision of his communication profile from his communication provider without the need for further actions in the manager of the means of transport or in the means of transport itself.

The method preferably further comprises creating a technical user profile in the central unit of the manager of the means of transport according to the user profile of the user in the central unit of the communication service provider. The identity of the user can thus be matched via the communication provider, i.e. a third party, with a technical profile on a component of the manager of the means of transport. A separate identification of the user in the manager of the means of transport is therefore not required.

The technical user profile can be created in the central unit of the manager of the means of transport independently and without explicit knowledge of the user, so that the user can load, install and enable his communication profile in the means of transport with little effort.

The method preferably further comprises exchanging data relating to the user and/or the vehicle between the central unit of the communication service provider and the central unit of the manager of the means of transport. The data can comprise or can be data which are required in order to authorize the provision of the communication profile in the means of transport and/or to provide the communication profile in the means of transport.

Enabling a provision of the communication profile for the means of transport by the central unit of the manager of the means of transport preferably comprises transmitting a message to the means of transport which enables a loading of the communication profile from the central unit of the communication service provider. The means of transport can receive, install and enable the communication profile of the user from the communication service provider by means of the data or information contained in the message.

The communication profile is preferably a SIM profile, and, in particular, an eSIM profile, of the user. The SIM or eSIM (embedded subscriber identity module) is a standardized method for securely embedding subscriber information in a module of a device for telecommunication. Security or data confidentiality is crucial for communication by means of the eSIM. The module contains a standardized digital certificate for this purpose. A multiplicity of different certificates exist worldwide, wherein a specific type of eSIM functions only with a specific type of certificate.

According to a further independent aspect of the present disclosure, a software (SW) program is indicated. The SW program can be configured to be executed on one or more processors, and thereby to execute the method described in this document for providing a communication function in a means of transport.

According to a further independent aspect of the present disclosure, a storage medium is indicated. The storage medium can comprise an SW program which is configured to be executed on one or more processors, and thereby to execute the method described in this document for providing a communication function in a means of transport.

According to a further independent aspect of the present disclosure, a central unit, in particular a manager of a means of transport, is indicated for providing a communication function in a means of transport, and, in particular, a vehicle. The central unit comprises one or more processors which are configured to receive a request from a central unit of a communication service provider to provide a communication profile in a means of transport, wherein identification information of the user is stored in the central unit of the communication service provider, and to enable the provision of the communication profile for the means of transport.

In some embodiments, the central unit of the manager of the means of transport can be a backend of a vehicle manufacturer which is enabled to communicate with the means of transport and manage functions of the means of transport.

The one or more processors of the central unit are preferably further configured to transmit a message to the means of transport, said message enabling the communication profile to be loaded from the central unit of the communication service provider.

According to a further independent aspect of the present disclosure, a system is indicated for providing a communication function in a means of transport, in particular a motor vehicle. The system comprises the central unit of the manager of the means of transport and the means of transport.

The means of transport is preferably a vehicle and, in particular, a motor vehicle. The means of transport can be a vehicle (e.g. a motor vehicle), a ship or an aircraft (e.g. a drone for passenger transport), but is not limited thereto. The term vehicle comprises passenger vehicles, trucks, buses, mobile homes, motorcycles, etc., which serve to transport passengers, goods, etc. in particular, the term comprises motor vehicles for passenger transport.

The means of transport preferably comprises a communication module. The communication module can be configured for communication according to the LTE (Long-Term Evolution) standard and/or the 5G standard.

In particular, the communication module of the means of transport can be configured in some embodiments to communicate wirelessly with the central unit of the manager of the means of transport and of the central unit of the communication service provider. Communication via further existing or future communication technologies is possible. However, the present disclosure is not restricted to mobile radio standards, and non-mobile radio standards can be used.

The communication module is, for example, a device which is capable of communicating wirelessly in a mobile network via Local Area Networks (LANs), such as e.g. Wireless LAN (WiFi/WLAN), or via Wide Area Networks (WANs) such as e.g. Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), 5G or World Wide Interoperability for Microwave Access (WIMAX).

According to a further independent aspect of the present disclosure, a means of transport, in particular a vehicle such as a motor vehicle, is indicated. The means of transport comprises a communication module according to the embodiments of the present disclosure.

BRIEF DESCRIPTION OF THE DRAWINGS

Exemplary embodiments of the disclosure are shown in the figures and are described in detail below, wherein:

FIG. 1 shows a flow diagram of a method for providing a communication function in a means of transport according to embodiments of the present disclosure.

DETAILED DESCRIPTION

Figure 2:
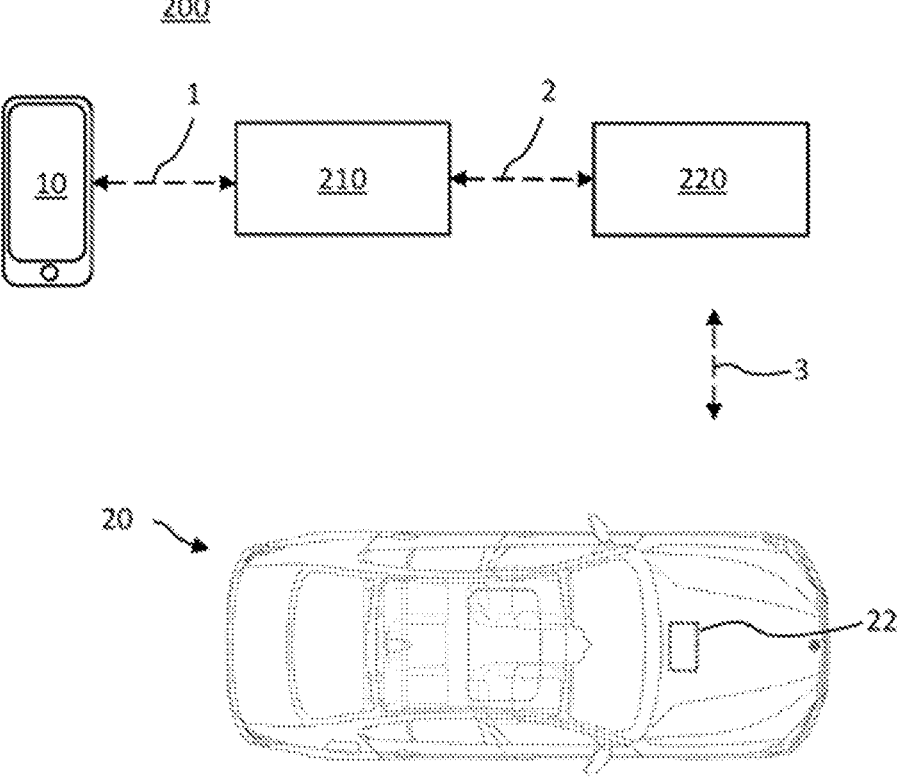
FIG. 2 shows schematically a system for providing a communication function in a means of transport according to embodiments of the present disclosure.

Unless otherwise indicated, the same reference numbers are used below for identical and identically functioning elements.

FIG. 1 shows a flow diagram of a method 100 for providing a communication function in a means of transport according to embodiments of the present disclosure. The method 100 can be implemented by corresponding software which is executable by one or more processors (e.g. a CPU).

The method 100 comprises, in block 110, receiving, in a central unit of a communication service provider in which identification information of a user is stored, a request from the user to use a communication profile in a means of transport; in block 120, receiving, in a central unit of a manager of a means of transport (e.g. a backend of a vehicle manufacturer), a request from the central unit of the communication service provider to provide the communication profile in the means of transport; and, in block 130, enabling the provision of the communication profile for the means of transport by the central unit of the manager of the means of transport.

The user does not therefore have to perform a separate login with the manager of the means of transport, such as e.g. a backend of a vehicle manufacturer, in order to download and activate his communication profile in the vehicle. It may be, for example, that a user uses a car-sharing vehicle and does not have a separate login available for this purpose. This would result in the user being unable to obtain connectivity. According to at least some embodiments, the user can nevertheless load, install and use his communication profile in the vehicle without further effort.

FIG. 2 shows schematically a system 200 for providing a communication function in a means of transport according to embodiments of the present disclosure. The means of transport can be a vehicle, and, in particular, a motor vehicle 10.

The user 10 can communicate via a first communication connection 1 with the central unit 210 of the communication service provider. The central unit 210 of the communication service provider can communicate via a second communication connection 2 with the central unit 220 of the manager of the means of transport. The central unit 220 of the manager of the means of transport can communicate via a third communication connection 3 with the means of transport 20 or a communication module 22 of the means of transport 20.

The first communication connection 1 and/or the second communication connection 2 and/or the third communication connection 3 can be implemented, for example, using a mobile network. The mobile network can be, for example, an LTE network or 5G network.

According to the embodiments of the present disclosure, the central unit 210 of the communication service provider in which identification information of a user is stored receives a request from the user 10 to use a communication profile in the means of transport 20. The central unit 220 of the manager of the means of transport (e.g. a backend of a vehicle manufacturer) then receives a request from the central unit 210 of the communication service provider to provide the communication profile in the means of transport 20. The central unit 220 of the manager of the means of transport then enables the provision of the communication profile for the means of transport 20.

In particular, the central unit 220 of the manager of the means of transport can issue a remote enablement command. This command is initiated by the central unit 220 of the manager of the means of transport, wherein the user performs the authorization with a third party, i.e. the communication service provider, rather than with the manager of the means of transport. A technical ID can always be created here in the manager of the means of transport for an ID of the communication service provider.

When the command is transmitted via the central unit 210 of the communication service provider, the corresponding ID can be matched with the technical ID of the manager of the means of transport.

The manager of the means of transport then transmits a command to a central eSIM component in the vehicle, e.g. via an eSIM controller of the central unit 220 of the manager of the means of transport. This component in the vehicle can perform the task of executing the eSIM operations following a successful login in the vehicle for the respective technical ID and can transmit a command to a profile manager (LPA) to activate the communication profile. The will of the user, which would otherwise be queried by way of a login, is therefore set aside and implied by way of the backend command. The same can apply to the deactivation and/or deletion of the communication profile.

In some embodiments, the means of transport 20 can download the communication profile via a direct communication connection (not shown) between the means of transport 20 and the central unit 210 of the communication service provider. Alternatively, the means of transport 20 can download the communication profile via an indirect communication connection, such as, for example, via the central unit 220 of the manager of the means of transport, from the central unit 210 of the communication service provider.

According to at least some embodiments, a user can use his own communication profile in a means of transport, even if the user, for example, does not have an account with the manager of the means of transport. A communication profile can thus be provided in the means of transport in a simple manner advantageous to the user. Furthermore, users who do not know any login details for the communication function in the vehicle can nevertheless use the communication function.

Although the exemplary embodiments have been illustrated and explained in detail, other variations can be derived therefrom by the person skilled in the art without departing the protective scope of the disclosure. It is therefore clear that a multiplicity of possible variations exist. It is similarly clear that embodiments cited by way of example in effect represent examples only which are not to be interpreted in any way as limiting e.g. the scope of protection of the possible applications or configurations. The preceding description and the description of the figures instead enable the person skilled in the art to implement the exemplary embodiments in concrete form, wherein the person skilled in the art, with knowledge of the disclosed concepts, can perform a wide variety of modifications, for example in respect of the function or the arrangement of individual elements specified in an exemplary embodiment, without departing the protective scope which is defined by the claims and their legal equivalents, such as more detailed explanations in the description.

The invention claimed is:

1. A method for providing a communication function in a means of transport, comprising:

receiving, in a central unit of a communication service provider in which identification information of a user is stored, the identification information associated with a communication profile of the user, a request from the user to use a communication profile in the means of transport;

receiving, in a central unit of a manager of the means of transport, a request from the central unit of the communication service provider to provide the communication profile in the means of transport;

creating a technical identification in the manager of the means of transport corresponding to the identification information of the user without direct communication between the user and the manager of the means of transport; and enabling provision of the communication profile for the means of transport by the central unit of the manager of the means of transport using the technical identification and without direct communication between the user and the manager of the means of transport.

2. The method as claimed in claim 1, further comprising:

authorizing the provision of the communication profile by the user in the central unit of the communication service provider.

3. The method as claimed in claim 2, wherein enabling provision of the communication profile for the means of transport by the central unit of the manager of the means of transport preferably comprises:

transmitting a message to the means of transport which enables a loading of the communication profile from the central unit of the communication service provider.

4. The method as claimed in claim 3, wherein the communication profile is a SIM profile of the user.

5. The method as claimed in claim 2, further comprising:

creating a technical user profile in the central unit of the manager of the means of transport according to a user profile of the user in the central unit of the communication service provider.

6. The method as claimed in claim 5, wherein enabling provision of the communication profile for the means of transport by the central unit of the manager of the means of transport preferably comprises:

transmitting a message to the means of transport which enables a loading of the communication profile from the central unit of the communication service provider.

7. The method as claimed in claim 6, wherein the communication profile is a SIM profile of the user.

8. The method as claimed in claim 1, further comprising:

creating a technical user profile in the central unit of the manager of the means of transport according to a user profile of the user in the central unit of the communication service provider.

9. The method as claimed in claim 8, wherein enabling provision of the communication profile for the means of transport by the central unit of the manager of the means of transport preferably comprises:

transmitting a message to the means of transport which enables a loading of the communication profile from the central unit of the communication service provider.

10. The method as claimed in claim 1, further comprising:

exchanging data relating to the user and/or the means of transport between the central unit of the communication service provider and the central unit of the manager of the means of transport.

11. The method as claimed in claim 1, wherein enabling provision of the communication profile for the means of transport by the central unit of the manager of the means of transport preferably comprises:

transmitting a message to the means of transport which enables a loading of the communication profile from the central unit of the communication service provider.

12. The method as claimed in claim 11, wherein the communication profile is a SIM profile of the user.

13. The method as claimed in claim 1, wherein the communication profile is a SIM profile or and eSIM profile of the user.

14. A storage medium having a software program which is configured to be executed on one or more processors, and thereby to execute the method as claimed in claim 1.

\*   \*   \*   \*   \*